United States Patent
Osborne et al.

(10) Patent No.: US 7,021,040 B2
(45) Date of Patent: Apr. 4, 2006

(54) VARIABLE MULCHING SYSTEM FOR A LAWNMOWER

(75) Inventors: Christopher M. Osborne, Hillsborough, NC (US); Dean E. Hartley, Burlington, NC (US)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 10/827,300

(22) Filed: Apr. 20, 2004

(65) Prior Publication Data

US 2004/0194443 A1 Oct. 7, 2004

Related U.S. Application Data

(62) Division of application No. 10/152,773, filed on May 23, 2002.

(51) Int. Cl.
*A01D 67/00* (2006.01)

(52) U.S. Cl. ..................................... 56/320.1
(58) Field of Classification Search ............... 56/255, 56/320.1, 320.2, 13.3, 13.7, 17.4, DIG. 20, 56/17.5, 17.2, 16.9, 16.7, 295
See application file for complete search history.

(56) References Cited

U.S. PATENT DOCUMENTS

| | | | |
|---|---|---|---|
| 3,118,267 A | | 1/1964 | Shaw |
| 3,134,212 A | | 5/1964 | Gary |
| 3,531,923 A | * | 10/1970 | Lay .............................. 56/12.8 |
| 3,884,020 A | | 5/1975 | Dahl et al. |
| 4,189,904 A | * | 2/1980 | Paker .......................... 56/255 |
| 4,312,174 A | | 1/1982 | Vanderhoef |
| 4,938,011 A | | 7/1990 | Pernia |
| 5,033,260 A | | 7/1991 | Jerry |
| 5,179,823 A | | 1/1993 | Pace |
| 5,191,756 A | | 3/1993 | Kuhn |
| 5,267,429 A | | 12/1993 | Kettler et al. |
| 5,355,666 A | | 10/1994 | McDonner et al. |
| 5,435,118 A | | 7/1995 | Cobile |
| 5,442,902 A | | 8/1995 | Mosley et al. |
| 5,457,947 A | | 10/1995 | Samejima et al. |
| 5,488,821 A | | 2/1996 | McCunn et al. |
| 5,491,964 A | | 2/1996 | Butler |
| 5,499,495 A | | 3/1996 | Heisman et al. |
| 5,826,417 A | | 10/1998 | Evans |
| 5,884,463 A | | 3/1999 | Darzinskis |

FOREIGN PATENT DOCUMENTS

WO     WO 94/10827     5/1994

* cited by examiner

*Primary Examiner*—Arpád Fáb Kovács
(74) *Attorney, Agent, or Firm*—Jenkins, Wilson & Taylor, P.A.

(57) ABSTRACT

A lawnmower is convertible between a bagging mode and a mulching mode. The convertible lawnmower includes a cutter housing having a discharge opening, an engine mount centrally positioned on the cutter housing, a prime mover supported on the engine mount, a rotary mulching blade coupled to the prime mover to rotate in a cutting plane about a rotation axis within the cutter housing, a cover and a fin extending from the cover toward the cutting plane. The cover is movably mounted within the cutter housing in a plane parallel to the cutting plane and between a fill bagging position where the discharge opening is unobstructed by the cover and a full mulching position where the cover obstructs the discharge opening.

24 Claims, 8 Drawing Sheets

VARIABLE MULCHING SYSTEM FOR A LAWNMOWER

This application is a division of 10/152,773 filed May 23, 2002.

BACKGROUND OF THE INVENTION

Lawnmowers can be configured as garden tractors, riding mowers, commercial walk-behind mowers and smaller walk-behind mowers. Smaller walk-behind mowers include a prime mover mounted to the deck. Mower decks associated with garden tractors, riding mowers and commercial walk-behind mowers are removably attached to the frame of these self-propelled machines in a manner that allows the deck to float along the contour of the terrain above an adjustable minimum height. These floating decks rely on a power take-off connected to the prime mover used to propel these self-propelled machines and, therefore, do not include a prime mover. More than one blade can be mounted in the cutting chamber of the deck for any of these embodiments of a lawnmower.

Lawnmowers can also be configured to either mulch the clippings or to discharge the clippings through a discharge chute. Mulching mowers cut the clippings into fine particles and blow the clippings below the lawn surface. Discharge mowers either discharge the clippings directly onto the lawn surface or into a bag for disposal elsewhere. Some lawnmowers can be converted between mulching lawnmowers and discharge lawnmowers by inserting or removing separate elements within the cutter housing and/or the discharge chute.

SUMMARY OF THE INVENTION

There is provided a lawnmower convertible between a bagging mode and a mulching mode. The convertible lawnmower includes a cutter housing having a discharge opening, an engine mount centrally positioned on the cutter housing, a prime mover supported on the engine mount, a rotary mulching blade coupled to the prime mover to rotate in a cutting plane about a rotation axis within the cutter housing, a cover and a fin extending from the cover toward the cutting plane. The cover is movably mounted within the cutter housing in a plane parallel to the cutting plane and between a full bagging position where the discharge opening is unobstructed by the cover and a full mulching position where the cover obstructs the discharge opening.

There is also provided a lawnmower convertible between a bagging mode and a mulching mode. The convertible lawnmower includes a cutter housing having a discharge opening, an engine mount centrally positioned on the cutter housing, a prime mover supported on the engine mount, a rotary mulching blade coupled to the prime mover to rotate in a blade circle about a rotation axis within the cutter housing, a cover, a fin extending from the cover toward the blade circle, and a handle. The cover is movably mounted within the cutter housing in a plane parallel to the blade circle and between a full bagging position where the discharge opening is unobstructed by the cover, a full mulching position where the cover obstructs the discharge opening and at least one position intermediate the full bagging position and the full mulching position where the cover partially obstructs the discharge opening. The handle is connected to the cover and extends external to the cutter housing. The handle is displaceable between a first position, a second position and at least one position intermediate the first position and the second position such that displacement of the handle between each of the first position, the second position and the at least one intermediate position of the handle moves the cover between each of the full bagging position, the full mulching position and the at least one intermediate position of the cover, respectively.

There is yet also provided a lawnmower convertible between a bagging mode and a mulching mode. The convertible lawnmower includes a cutter housing having a discharge opening, an engine mount on the cutter housing, a prime mover supported on the engine mount, a mulching blade coupled to the prime mover to rotate within the cutter housing, a cover, a rotary knob operatively connected to the cover and indicia adjacent the rotary knob. The cover slides within the cutter housing between a full bagging position where the discharge opening is substantially unobstructed by the cover and a full mulching position where the cover substantially obstructs the discharge opening. The indicia indicate the operational state of the cover based on the position of the rotary knob relative to the indicia.

There is further provided a lawnmower convertible between a bagging mode and a mulching mode. The convertible lawnmower includes a cutter housing having a discharge opening, a rotary mulching blade mounted to rotate in a cutting plane about a rotation axis within the cutter housing, and a cover pivotable within the cutter housing. The cover projects an area onto the cutting plane at a location where the cover overlaps the cutting plane. The projected area changes in size as the cover moves between a full bagging position where the discharge opening is unobstructed by the cover and a full mulching position where the cover obstructs the discharge opening.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
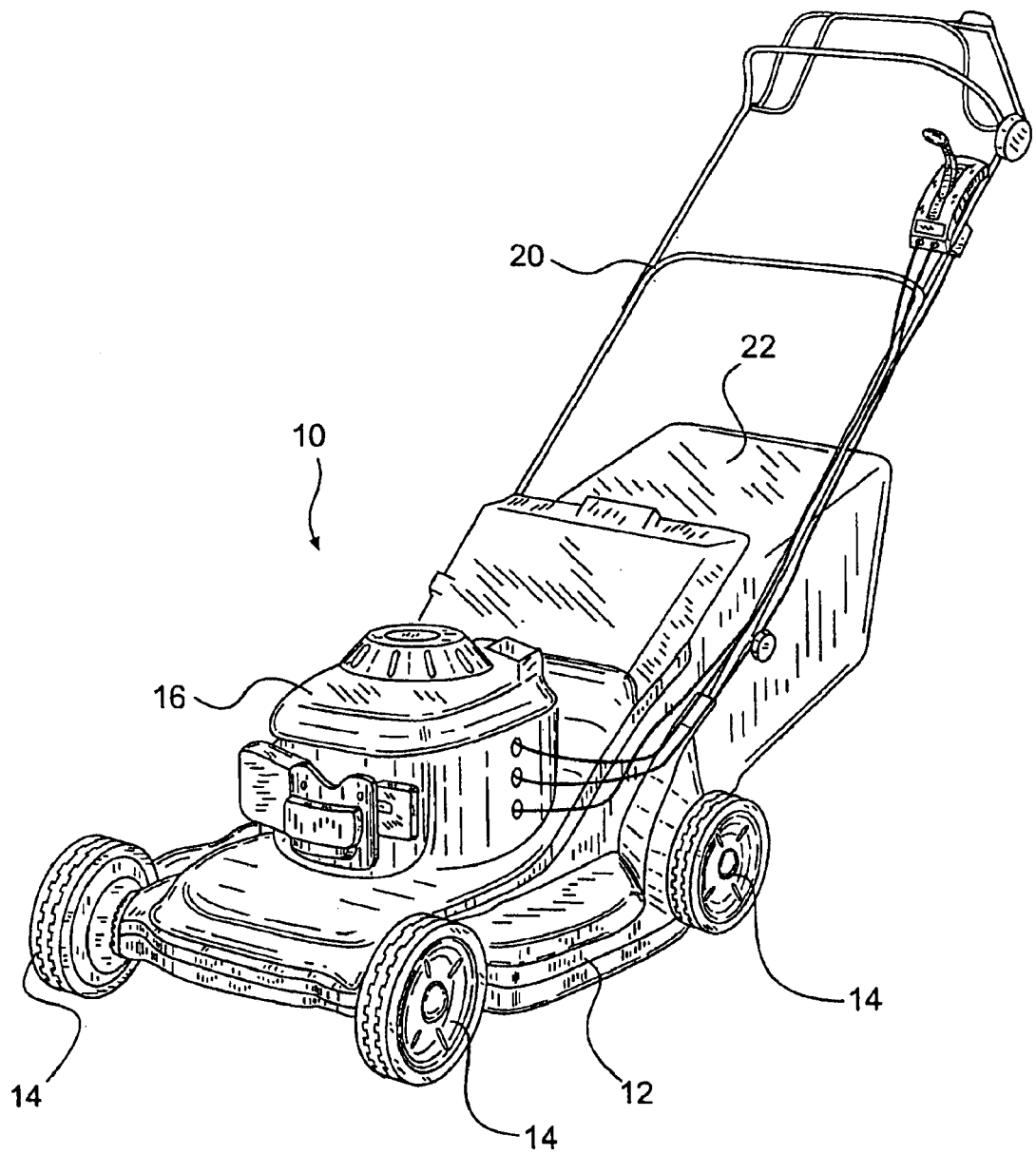
FIG. 1 is a perspective view of a lawnmower according to the present invention.

Referring to FIG. 1, a lawnmower 10 includes a deck 12, wheels 14, a prime mover 16 (e.g., an internal combustion engine or an electric motor) mounted to the deck 12, a blade 18 (see FIG. 2) connected to the prime mover 16 below the deck 12, a steering handle 20 connected to and extending upwardly from the deck 12 and a collection bag 22.

Figure 2:
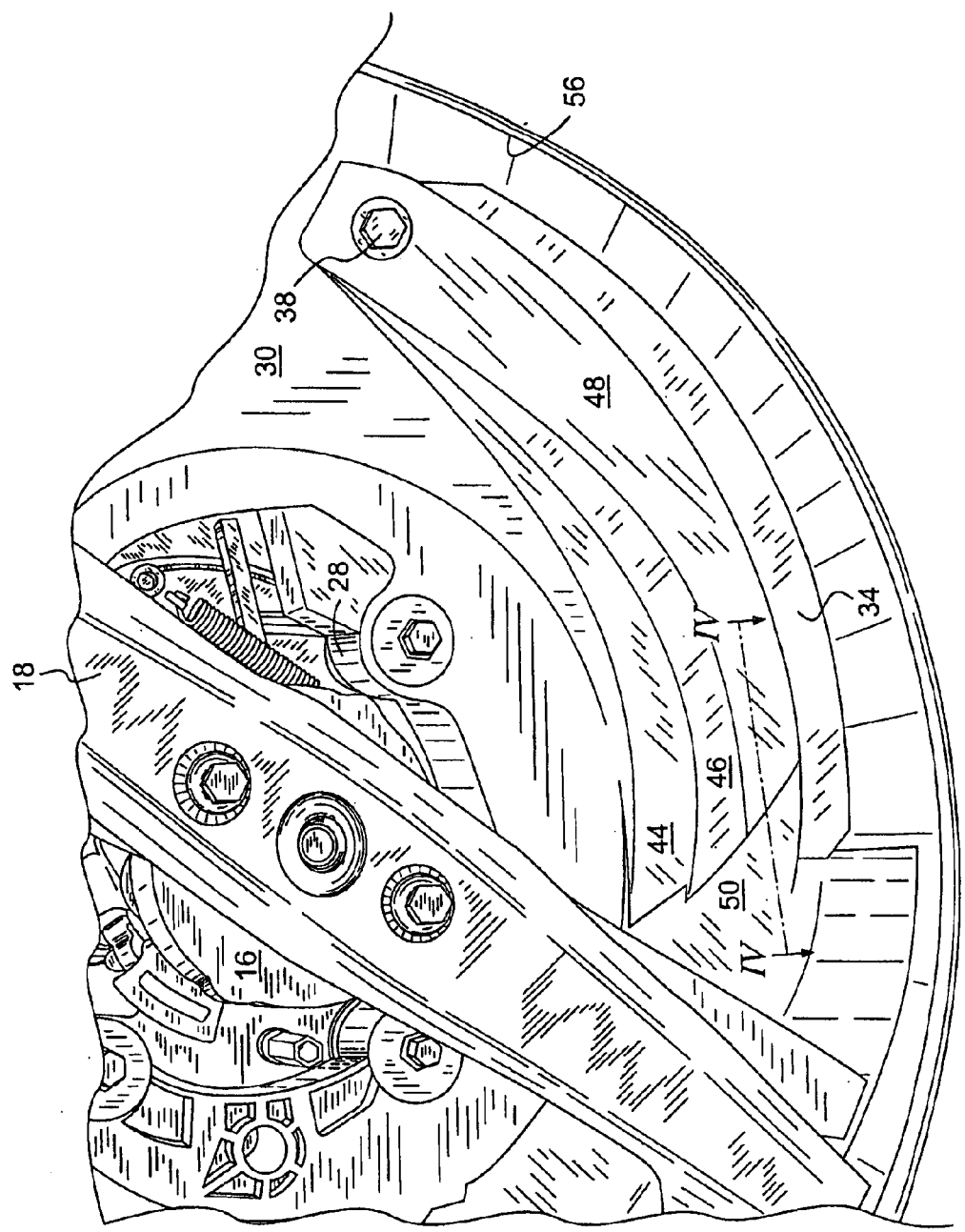
FIG. 2 is a bottom view of the lawnmower according to FIG. 1 including a lawnmower accessory in one of a plurality of positions according to the present invention.
Figure 3:
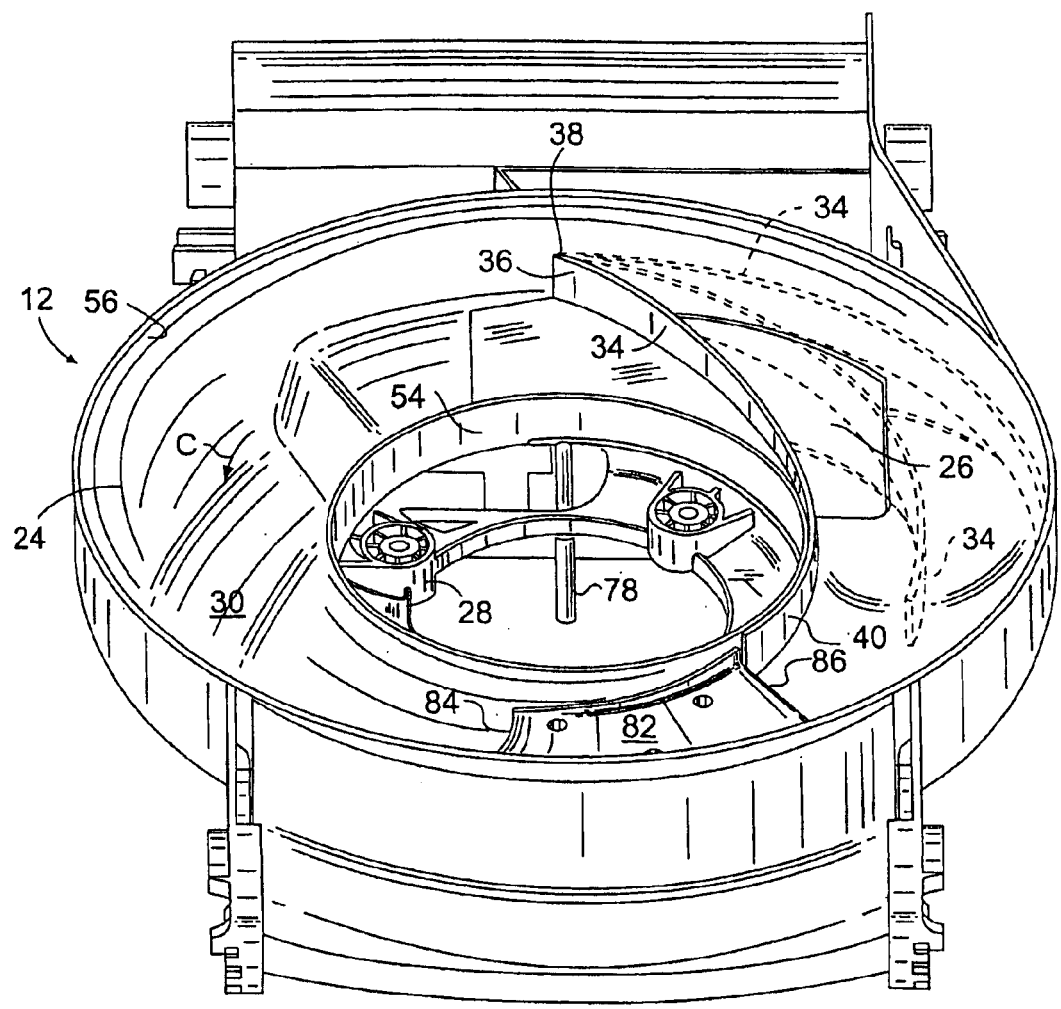
FIG. 3 is a front perspective view of the bottom of the lawnmower including a lawnmower accessory according to FIG. 2 in a plurality of positions.

Referring to FIGS. 2 and 3, the deck 12 includes a cutter housing 24 having a discharge opening 26 and an engine mount 28 centrally positioned on the cutter housing 24. As shown in FIG. 1, the prime mover 16 is supported on the engine mount 28 and the collection bag 22 can be connected to the cutter housing 24 by way of the discharge opening 26 to collect the clippings for disposal away from the lawn.

Figure 5:
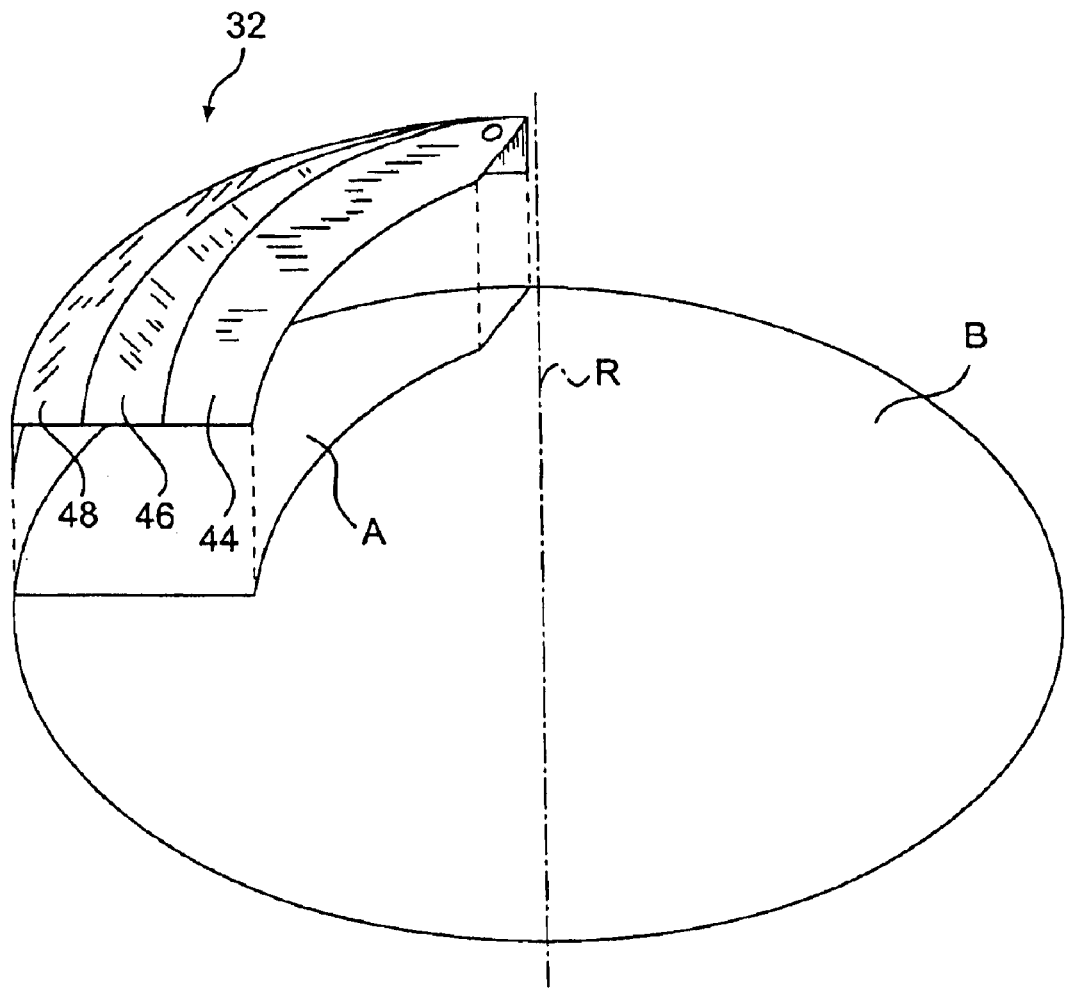
FIG. 5 is a perspective view of the top of a lawnmower accessory of the lawnmower according to FIG. 2.

FIG. 2 shows the blade 18 coupled to the prime mover 16 to rotate within the cutter housing 24. Preferably, the blade 16 is a mulching blade configured as either a single cutting element or as multiple cutting elements. As shown in FIGS. 3 and 5, the blade 16 rotates about a rotation axis R in a blade circle B lying in a cutting plane. The vegetation is cut at the level of the cutting plane and circulates adjacent the roof 30 of the cutter housing 24 along a circulation path C until a saturation amount of circulating clippings is reached. Upon reaching the saturation level, the circulating clippings begin to fall back down across the blade 18 where they are cut again and blown into the lawn below the level of the cutting plane.

Figure 4:
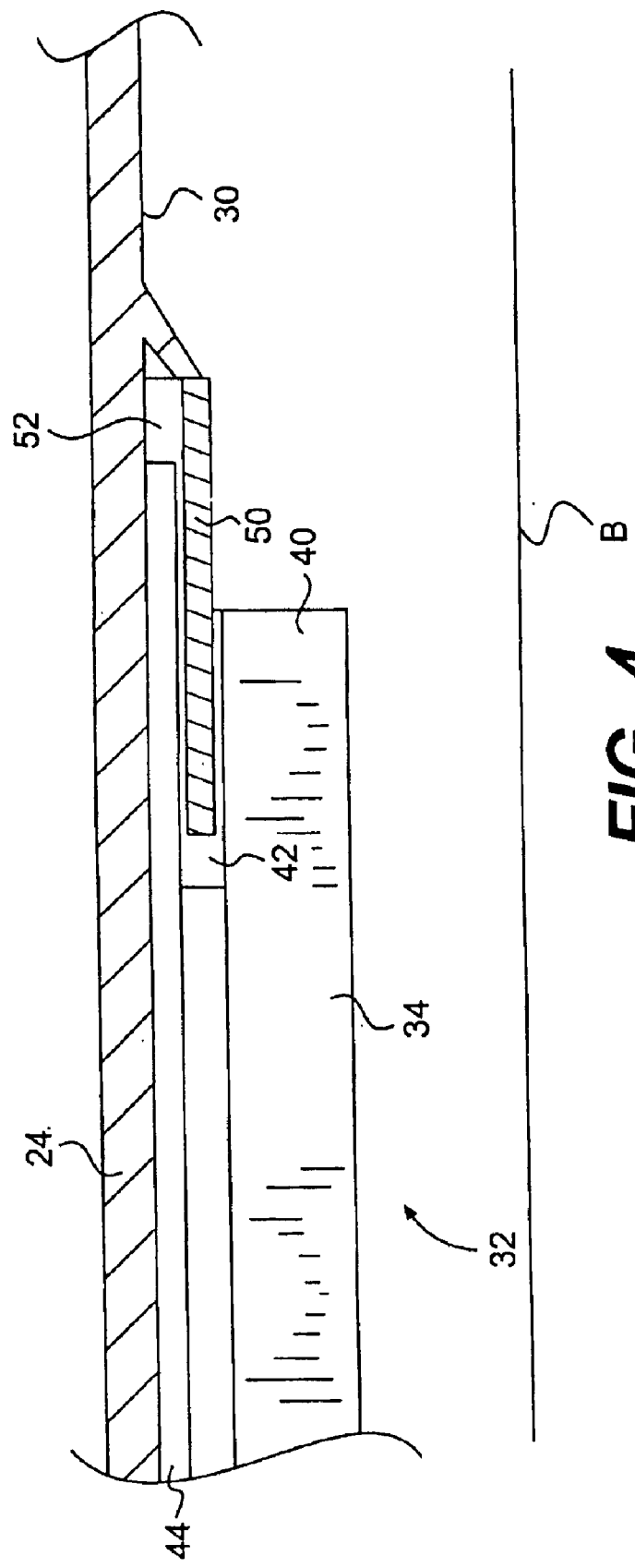
FIG. 4 is a cross-sectional view of a cutter housing of the lawnmower of FIG. 2 taken along IV—IV.

FIGS. 2–4 show a lawnmower accessory configured as a cover 32 that moves within the cutter housing 24 between a first position (FIG. 3) and a second position (FIG. 2). The cover 32 is pivotally mounted within the cutter housing 24 in a plane parallel to the blade circle B (FIG. 4) between the first position and the second position.

The first position can be a full bagging position where the discharge opening 26 is substantially unobstructed by the cover 32 and the second position can be a full mulching position where the cover 32 substantially obstructs the discharge opening 26. Additionally, the cover 32 can pivot to at least one position intermediate the first position and the second position (intermediate position shown in phantom in FIG. 3). Preferably, the cutter housing 24 is annular and the cover 32 extends along a sector of the cutter housing 24, as shown in FIG. 2.

The cover 32 projects an area A onto the cutting plane where the cover 32 overlaps the cutting plane. Preferably, as shown in FIG. 5, the cover 32 overlaps the cutting plane within the perimeter of the blade circle B and the projected area A lies within the blade circle B. Alternatively, the location and/or size of any combination of the discharge opening 26, the cover 32 and the cutter housing 24 can be changed from that illustrated in FIGS. 1–6 such that the projected area A can lie partially or completely outside of the blade circle B.

Under adverse mowing conditions, such as wet vegetation, tall vegetation or thick vegetation, the clippings can clog the discharge opening 26 before the collection bag 22 is full or cause clumping even when mulching the clippings. Also, when such mowing conditions exist when the lawnmower is in the fill mulching mode, the amount of clippings circulating in the cutter housing 24 can overwhelm the prime mover 16 and cause it to stall. These results can require repeated stopping and starting of the lawnmower 10, which, in turn, can extend the time necessary to mow the lawn.

By regulating the position of the cover 32 in response to the cutting conditions, the operator can control the amount of grass being collected and mulched at any given time so that clogging, clumping and stalling of the prime mover 16 can be minimized during these adverse mowing conditions.

With the cover 32 in the full mulching position, the operator can translate the cover 32 toward the full bagging position if the clippings begin to clump until enough of the clippings pass through the discharge opening 26 and into the collection bag 22 to stop the clumping. Conversely, with the cover 32 in the full bagging position, the operator can continue to mow when the access to the collection bag 22 becomes clogged with clippings by positioning the cover 32 in any position other than the full bagging position so that at least some of the clippings are mulched. Positioning the cover 32 in any one of the intermediate positions minimizes unwanted clumping or stalling of the prime mover 16 because some of the clippings escape the cutter housing 24 through the discharge opening 26 and are collected in the collection bag 22 while the remainder get mulched.

Referring to FIGS. 3 and 4, a fin 34 connects to and extends from the cover 32 toward the blade circle B intermediate the discharge opening 26 and blade circle B. The fin 34 includes a first end 36 adjacent to a pivot 38 and a second end 40 including a slot 42 extending toward the first end 36 of the fin 34. The fin 34 extends arcuately from the first end 36 to the second end 40 in a direction substantially parallel to the blade circle B.

As viewed in FIGS. 2 and 4, the cover 32 includes a plurality of shutters 44, 46, 48 extending substantially parallel to the blade circle B. The shutters 44, 46, 48 are stacked in a direction parallel to the rotation axis and slide laterally relative to one another. Each of the shutters 44, 46, 48 includes a first end and a second end. The pivot 38 connects the first ends of the shutters to the cutter housing 24.

As illustrated in FIGS. 2 and 4, a support 50 is spaced from and secured to the cutter housing. The second ends of the shutters 44, 46, 48 slide along the support 50 between a collapsed position where the shutters 44, 46, 48 overlie one another, at least one intermediate position (intermediate position in phantom in FIG. 3) where the shutters 44, 46, 48 partially overlap one another, and an extended position (FIG. 2) where the shutters 44, 46, 48 extend laterally from one another. The collapsed position corresponds to the full bagging position of the cover 32, the extended position corresponds to the full mulching position of the cover 32 and the intermediate positions correspond to the intermediate positions of the cover 32. FIG. 4 shows the second end of each of the shutters 44, 46, 48 extending into the space 52 between the support 50 and the cutter housing 24. The support 50 extends into the slot 42 in the fin 34. As shown in FIG. 5, the fin 34 extends from one of the shutters 48 toward the blade circle B.

Referring to FIGS. 2, 3 and 5, the shutters 44, 46, 48 provide a surface of the cover 32 that extends approximately parallel to the cutting plane. The area of this cover surface changes between a minimum when the shutters 44, 46, 48 are in the collapsed position and a maximum when the shutters 44, 46, 48 are in the expanded position. FIGS. 2 and 5 illustrate the maximum size of the area of the cover surface.

The projected area A changes in size as the cover 32 moves between the full bagging position and the full mulching position. The size of the projected area A of FIG. 5 is variable and proportional to the size of the area of the cover surface. The projected area A varies between a minimum size when the shutters 44, 46, 48 are in the collapsed position and a maximum size greater than the minimum size when the shutters 44, 46, 48 are in the extended position. FIG. 5 illustrates the projected area A having the maximum size.

The minimum size of the area A could be approximately less than or equal to the area of one 48 of the shutters 44, 46, 48. Preferably, the projected area A is at most approximately equal to the area of the cover surface at each position of the cover 32 between the full bagging position and the full mulching position.

Referring to FIG. 3, the cutter housing 24 includes an inner scroll 54 centered about the engine mount 28 and an outer scroll 56 centered about the inner scroll 54. The discharge opening 26 is in the outer scroll 56. The inner scroll 54 includes a recess (not shown) aligned with the fin 34 and the one shutter 48. The recess receives the fin 34 and the one shutter 48 when the one shutter 48 is the collapsed position. The support 50 spans from the outer scroll 56 to the inner scroll 54.

The first end 36 of the fin 34 is adjacent the junction of the roof 30 and the outer scroll 56. The second end 40 of the fin 34 is movable between a first position adjacent the inner scroll 54 when the shutters 44, 46, 48 are in the collapsed position, a second position adjacent the outer scroll 56 when the shutters 44, 46, 48 are in the extended position, and at least one position intermediate the first position and the second position when the shutters 44, 46, 48 are in the intermediate position. The first position corresponds to the full bagging position of the cover 32, the second position corresponds to the full mulching position of the cover 32 and the intermediate positions correspond to the intermediate positions of the cover 32.

Referring to FIG. 2, the shutters 44, 46, 48 include a first shutter 44, a second shutter 46 and a third shutter 48. The fin 34 extends from the third shutter 48. As explained below, each the three shutters 44, 46, 48 sequentially overlap one another as the cover moves from the full mulching position to the full bagging position.

Figure 6:
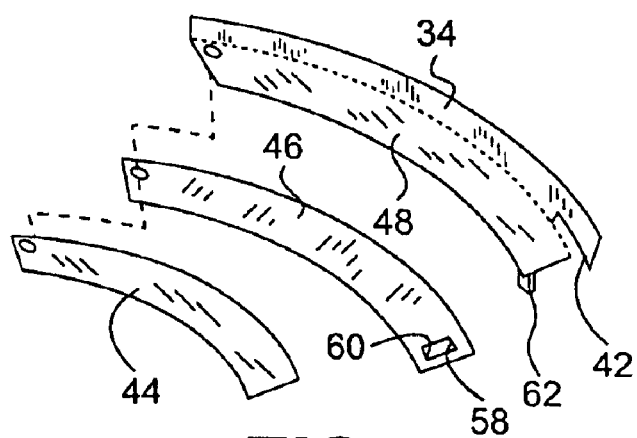
FIG. 6 is an exploded view of the lawnmower accessory according to FIG. 2.

The first shutter 44 includes a first end connected to the roof 30 adjacent the outer scroll 56 and a second end adjacent the inner scroll 54. The second shutter 46 is movable relative to the first shutter 44 and includes a first end connected to the roof 30 adjacent the outer scroll 56 and a second end. Referring to FIG. 6, a first abutment 58 and a second abutment 60 are adjacent the second end of the second shutter 46. The third shutter 48 is movable relative to the second shutter 46 and includes a first end connected to the roof 30 adjacent the outer scroll 56 and a second end. A third abutment 62 is adjacent the second end of the third shutter 48. The third abutment 62 engages the first abutment 58 when the cover 32 moves toward the full mulching position and the third abutment 62 engages the second abutment 58 when the cover 32 moves toward the full bagging position. Preferably, the first abutment 58 and second abutment 60 are opposite ends of a slot and the third abutment 62 is a projection slidably received in the slot. However, other lost motion arrangements can be used as long as the shutters 44, 46 and 48 can interact with each other to expand and collapse as the cover moves between the full mulching position and the full bagging position.

Figure 7:
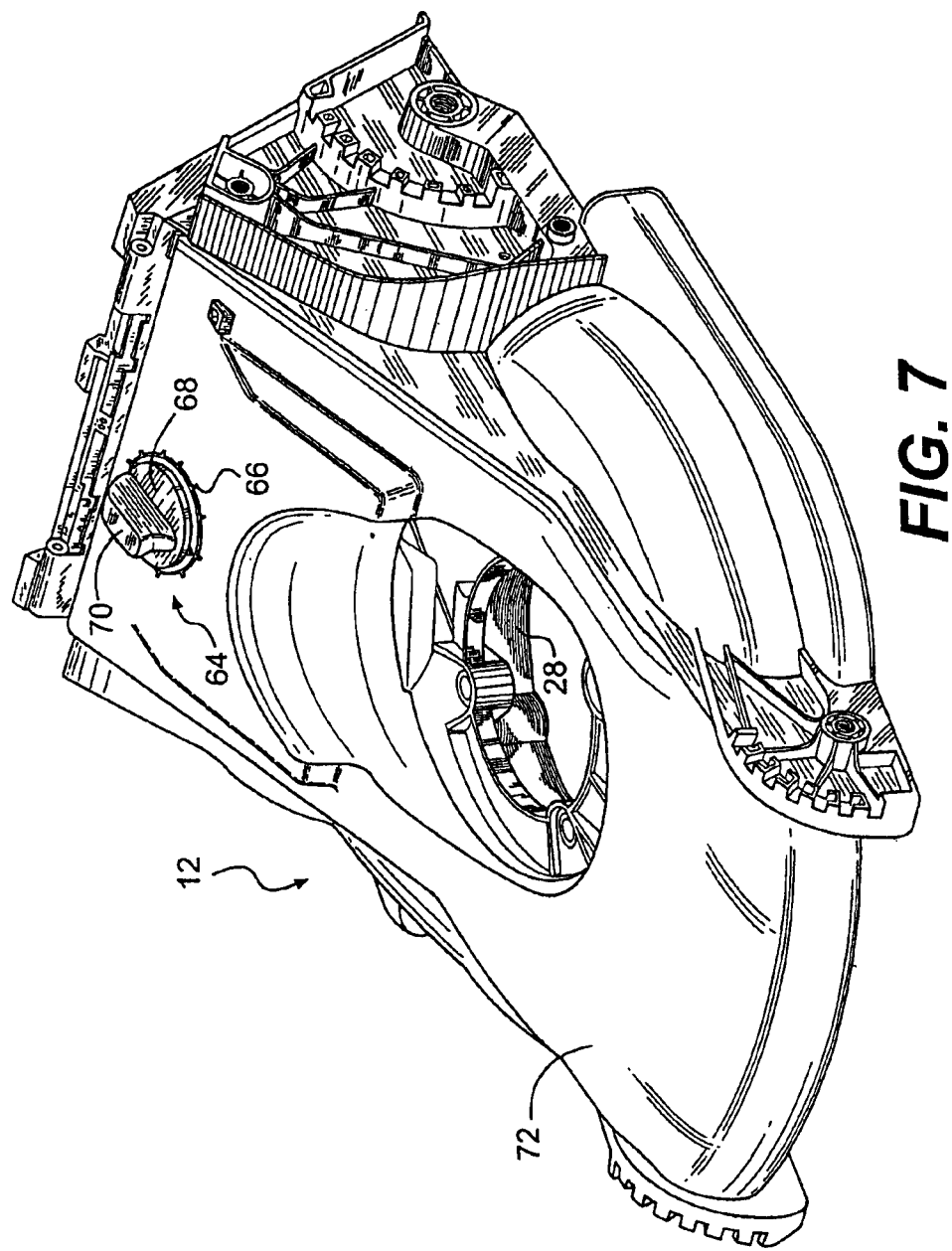
FIG. 7 is front perspective view of the top of the lawnmower deck according to FIG. 4.

Referring to FIG. 7, a handle 64 is connected to the cover 32 and extends external to the cutter housing 24. The handle 64 is displaceable between a first position, a second position and at least one position intermediate the first position and the second position. Displacement of the handle 64 between each of the first position, the second position and the at least one intermediate position of the handle 64 moves the cover 32 between each of the full bagging position, the full mulching position and the at least one intermediate position of the cover 32, respectively.

Preferably, the handle 64 is a rotary knob operatively connected to the cover 32. Indicia 66 adjacent the rotary knob 64 indicate the operational state of the cover 32 based on the position of the rotary knob 64 relative to the indicia 66. The rotary knob 64 includes a circular base 68 and an elongated grip 70 extending from the circular base 66. The width of the elongated grip 70 is less than one-half of the diameter of the circular base 66.

Figure 8:
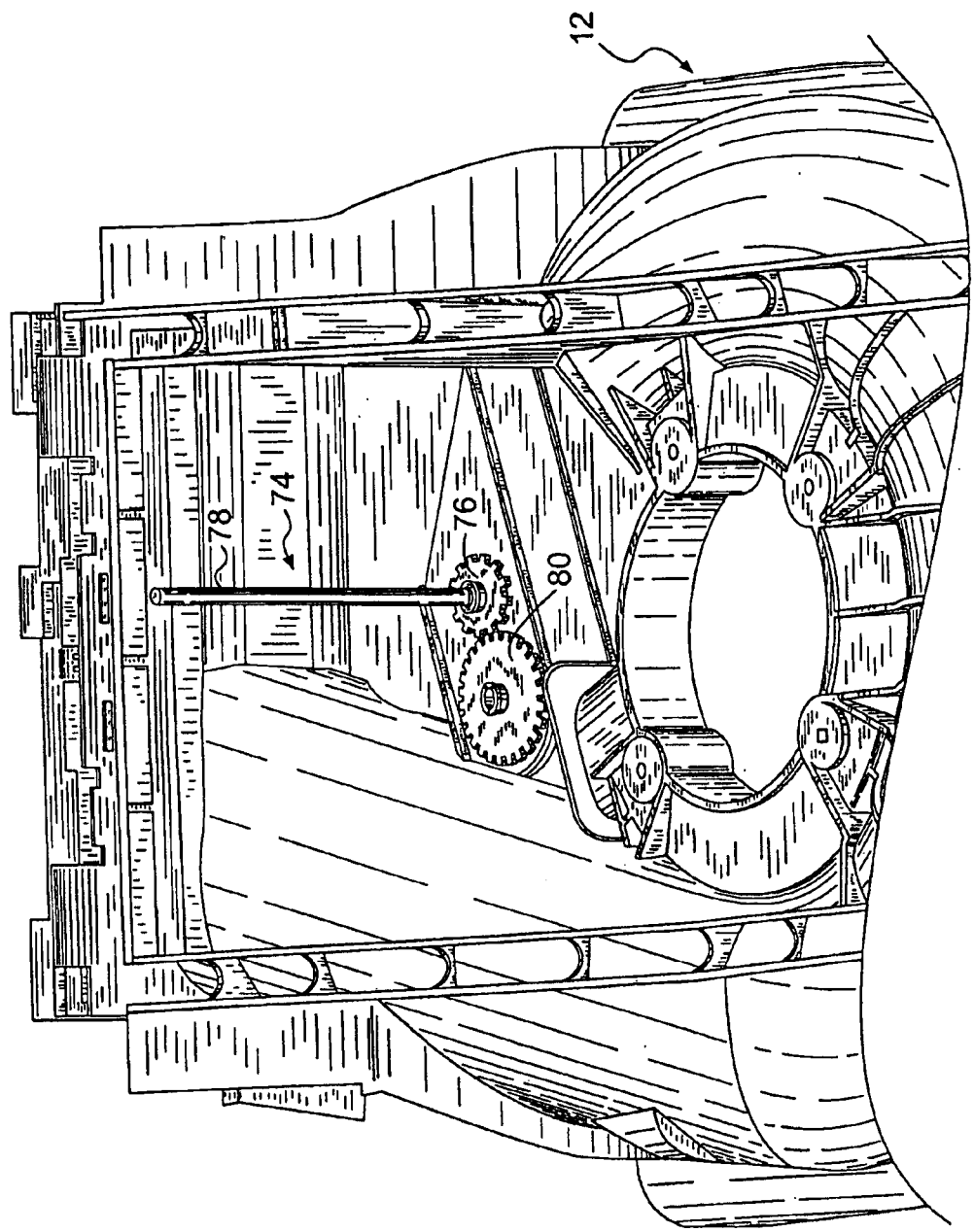
FIG. 8 is a perspective view of the top of the lawnmower deck according to FIG. 6 with the deck cover removed to show the actuation transmission.

FIG. 8 shows the deck 12 with the deck cover 72 removed to expose an actuation transmission 74 that connects the rotary knob 64 to the cover 32. The actuation transmission 74 has a first end connected to the rotary knob 64 and a second end connected to the cover 32. The actuation transmission 74 can be a gear assembly that includes a first gear 76 connected to the rotary knob 64 by a shaft 78. A second gear 80 at the second end of the actuation transmission 74 is connected to the pivot 38 and engages the first gear 76. The first gear 76 engages the second gear 80 such that rotary movement of the rotary knob 64 results in movement of the cover 32 and the fin 34 about the pivot 38 between each of the full bagging position, the at least one intermediate position and the full mulching position. Preferably, the gear ratio of the first gear 76 and the second gear 80 can be set to provide an angular displacement of the cover 32 that is less than the angular displacement of the rotary knob 64. The positions of the cover 32 and the fin 34 are infinitely variable between each of the full bagging position, the at least one intermediate position and the full mulching position due to the interaction of the gears 76, 80.

If a reduction in the displacement of the cover 32 relative to the knob is not desired, then the gears 76, 80 can be eliminated to directly connect the rotary knob 64 to the pivot 38 through the shaft 78.

Figure 9:
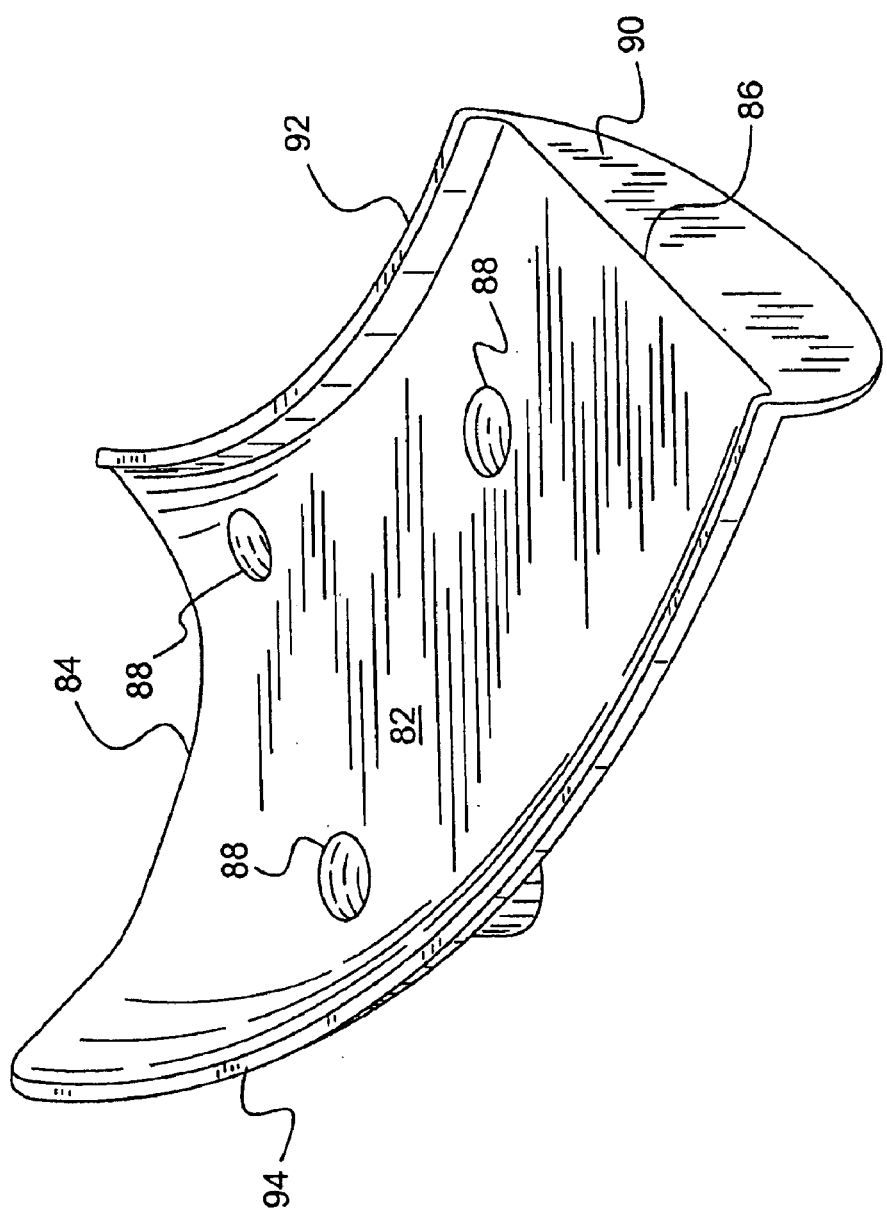
FIG. 9 is a rear perspective view of the bottom of a ramp according to FIG. 3.

As shown in FIGS. 3 and 9, a ramp 82 is mounted to the roof 30 of the cutter housing 24 near the cover 32. As will be discussed below, the ramp 82 cooperates with the cover 32 to divert the clippings in the circulation path C into the discharge opening 26 when the cover 32 is in any position other than the full mulching position.

The ramp 82 includes a leading edge 84 adjacent the roof 30 and a trailing edge 86 spaced from the roof 30 by a rear face 90 to lie approximately co-planar with the shutters 44, 46, 48. The trailing edge 86 is positioned proximate the cover 32. The rear face 90 extends from the trailing edge 86 to the roof 30 and conforms to the interior profile of the cutter housing 24. The ramp 82 also includes an inner flange 92 and an outer flange 94 that extend along and conform to the inner scroll 54 and the outer scroll 56, respectively.

The ramp 82 can be secured to the roof 30 of the cutter housing 24 by mounting bosses 88 adapted to receive fasteners, such as self-tapping screws (not shown). Alternatively, the ramp 82 can be integrally formed in the roof 30 of the cutter housing 24.

The trailing edge 86 is located approximately co-planar with the shutters 44, 46, 48 so that the clippings can be diverted from the roof 30 toward the blade 18 to a level at least even with the shutters 44, 46, 48. As shown in FIGS. 2 and 3, preferably, the support 50 is provided by the ramp 82 adjacent to the trailing edge 86.

The ramp 82 reduces the potential for the circulating clippings to clump onto the cover 32 by diverting the most of the circulating clippings to strike the cover 32 at an acute angle relative to the surface of cover 32 and at least softens the impact of the clippings onto the cover 32. Clumping on the fin 34-and/or other portions of the cover 32 can obstruct the circulation path C and reduce the efficiency at which the clippings are bagged and/or mulched.

The ramp 82 can also extend the area of the lawn over which the lawnmower 10 traverses while mowing before the bag 22 requires emptying when the cover 32 is in any position other than the full mulching position. The ramp 82 could divert a portion of the clippings across the blade 18 so that they are mulched by the blade 18 and blown into the lawn. Thus, the amount of clippings collected in the bag 22 can be reduced. Although the ramp 82 is not necessary for effective operation of the cover 32, the ramp 82 can enhance the performance offered by the cover 32.

Although the preferred embodiments of the invention illustrate a small walk-behind lawnmower, the invention is also intended for use on commercial walk-behind mowers, riding mowers and lawn tractors.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A lawnmower convertible between a bagging mode and a mulching mode, the convertible lawnmower comprising:
   a cutter housing having a discharge opening;
   an engine mount centrally positioned on the cutter housing;
   a prime mover supported on the engine mount;
   a rotary mulching blade coupled to the prime mover to rotate in a blade circle along a cutting plane about a rotation axis within the cutter housing;
   a cover mounted within the cutter housing above the blade circle in a plane parallel to the cutting plane, the cover being movable between a full bagging position where the discharge opening is unobstructed by the cover and a full mulching position where the cover obstructs the discharge opening; and
   a fin extending from the cover toward the cutting plane.

2. The convertible lawnmower according to claim 1, further comprising at least one position intermediate the full bagging position and the full mulching position where the cover partially obstructs the discharge opening.

3. The convertible lawnmower according to claim 1, wherein the cover includes:
   a plurality of shutters extending substantially parallel to the cutting plane, the plurality of shutters stacked in a direction parallel to the rotation axis and slidable laterally relative to one another, each of the plurality of shutters including:
   a first end; and
   a second end;
   a pivot connecting the first ends of the plurality of shutters to the cutting housing; and
   a support spaced from and secured to the cutting surface;
   wherein the second ends of the plurality of shutters are slidable along the support between a collapsed position where the plurality of shutters overlie one another, an intermediate position where the plurality of shutters partially overlap one another, and an extended position where the plurality of shutters extend laterally from one another.

4. The convertible lawnmower according to claim 3, wherein the fin extends from one of the plurality of shutters, the fin including:
   a first end adjacent to the pivot; and
   a second end including a slot extending toward the first end of the fin;
   wherein the support extends into the slot.

5. The convertible lawnmower according to claim 4, wherein the cutter housing includes:
   an inner scroll centered about the engine mount; and
   an outer scroll centered about the inner scroll and the discharge opening being in the outer scroll;
   the fin extending from one of the plurality of shutters toward the cutting plane and arcuately in a direction substantially parallel to the cutting plane and the first end of the fin being adjacent the junction of the roof and the outer scroll.

6. The convertible lawnmower according to claim 4, wherein the second end of the fin is movable between a first position adjacent the inner scroll when the plurality of shutters are in the collapsed position, a second position adjacent the outer scroll when the plurality of shutters are in the extended position, and at least one position intermediate the first position and the second position when the plurality of shutters are in the intermediate position.

7. The convertible lawnmower according to claim 4, wherein the inner scroll includes a recess aligned with the fin and the one shutter, the fin and the one shutter received in the recess when the one shutter is in the collapsed position.

8. The convertible lawnmower according to claim 4, wherein the support spans from the outer scroll to the inner scroll.

9. The convertible lawnmower according to claim 4, wherein the second end of each of the plurality of shutters extends into the space between the support and the cutter housing.

10. The convertible lawnmower according to claim 1, wherein the cover includes:
    a first shutter connected to a roof of the cutter housing adjacent the outer scroll;
    a second shutter movable relative to the first shutter and connected to the roof adjacent the outer scroll, the second shutter including a first abutment and a second abutment; and
    a third shutter movable relative to the second shutter and connected to the roof adjacent the outer scroll, the third shutter including a third abutment;
    the third abutment engaging the first abutment when the cover moves toward the full mulching position and the third abutment engaging the second abutment when the cover moves toward the full bagging position; and
    wherein the fin extends from the third shutter.

11. The convertible lawnmower according to claim 10, wherein the first shutter, the second shutter, and the third shutter sequentially overlie one another as the cover moves from the full mulching position to the full bagging position.

12. The convertible lawnmower according to claim 3, wherein the fin lies intermediate the cutting plane and the discharge opening.

13. The convertible lawnmower according to claim 1, further comprising a ramp secured in the cutter housing proximate to the cover.

14. A lawnmower convertible between a bagging mode and a mulching mode, the convertible lawnmower comprising:
    a cutter housing having a discharge opening;
    an engine mount centrally positioned on the cutter housing;

a prime mover supported on the engine mount;
a rotary mulching blade coupled to the prime mover to rotate in a cutting plane about a rotation axis within the cutter housing;
a cover movably mounted within the cutter housing in a plane parallel to the cutting plane and between a full bagging position where the discharge opening is unobstructed by the cover and a full mulching position where the cover obstructs the discharge opening; and
a fin extending from the cover toward the cutting plane; and
wherein the cover includes:
   a plurality of shutters extending substantially parallel to the cutting plane, the plurality of shutters stacked in a direction parallel to the rotation axis and slidable laterally relative to one another, each of the plurality of shutters including:
      a first end; and
      a second end;
   a pivot connecting the first ends of the plurality of shutters to the cutting housing; and
   a support spaced from and secured to the cutting surface;
   wherein the second ends of the plurality of shutters are slidable along the support between a collapsed position where the plurality of shutters overlie one another, an intermediate position where the plurality of shutters partially overlap one another, and an extended position where the plurality of shutters extend laterally from one another.

15. The convertible lawnmower according to claim 14, wherein the fin extends from one of the plurality of shutters, the fin including:
   a first end adjacent to the pivot; and
   a second end including a slot extending toward the first end of the fin;
   wherein the support extends into the slot.

16. The convertible lawnmower according to claim 15 wherein:
   the cutter housing includes:
      an inner scroll centered about the engine mount; and
      an outer scroll centered about the inner scroll and the discharge opening being in the outer scroll; and
   the fin extending from one of the plurality of shutters toward the cutting plane and arcuately in a direction substantially parallel to the cutting plane and the first end of the fin being adjacent the junction of the roof and the outer scroll.

17. The convertible lawnmower according to claim 15 wherein the second end of the fin is movable between a first position adjacent the inner scroll when the plurality of shutters are in the collapsed position, a second position adjacent the outer scroll when the plurality of shutters are in the extended position, and at least one position intermediate the first position and the second position when the plurality of shutters are in the intermediate position.

18. The convertible lawnmower according to claim 15 wherein the inner scroll includes a recess aligned with the fin and the one shutter, the fin and the one shutter received in the recess when the one shutter is in the collapsed position.

19. The convertible lawnmower according to claim 15 wherein the support spans from the outer scroll to the inner scroll.

20. The convertible lawnmower according to claim 15 wherein the second end of each of the plurality of shutters extends into the space between the support and the cutter housing.

21. The convertible lawnmower according to claim 14 wherein the fin lies intermediate the cutting plane and the discharge opening.

22. A lawnmower convertible between a bagging mode and a mulching mode, the convertible lawnmower comprising:
   a cutter housing having a discharge opening;
   an engine mount centrally positioned on the cutter housing;
   a prime mover supported on the engine mount;
   a rotary mulching blade coupled to the prime mover to rotate in a cutting plane about a rotation axis within the cutter housing;
   a cover movably mounted within the cutter housing in a plane parallel to the cutting plane and between a full bagging position where the discharge opening is unobstructed by the cover and a full mulching position where the cover obstructs the discharge opening; and
   a fin extending from the cover toward the cutting plane; and
   wherein the cover includes:
      a first shutter connected to a roof of the cutter housing adjacent the outer scroll;
      a second shutter movable relative to the first shutter and connected to the roof adjacent the outer scroll, the second shutter including a first abutment and a second abutment; and
      a third shutter movable relative to the second shutter and connected to the roof adjacent the outer scroll, the third shutter including a third abutment;
      the third abutment engaging the first abutment when the cover moves toward the full mulching position and the third abutment engaging the second abutment when the cover moves toward the full bagging position; and
   wherein the fin extends from the third shutter.

23. The convertible lawnmower according to claim 22 wherein the first shutter, the second shutter, and the third shutter sequentially overlie one another as the cover moves from the full mulching position to the full bagging position.

24. A lawnmower convertible between a bagging mode and a mulching mode, the convertible lawnmower comprising:
   a cutter housing having a discharge opening;
   an engine mount centrally positioned on the cutter housing;
   a prime mover supported on the engine mount;
   a rotary mulching blade coupled to the prime mover to rotate in a cutting plane about a rotation axis within the cutter housing;
   a cover mounted within the cutter housing in a plane at least substantially parallel to the cutting plane, the cover being movable between a full bagging position where the discharge opening is unobstructed by the cover and a full mulching position where the cover obstructs the discharge opening; and
   the cover comprising a plurality of shutters extending at least substantially parallel to the cutting plane and slidable laterally relative to one another.

* * * * *